Patented Jan. 14, 1936

2,027,902

UNITED STATES PATENT OFFICE 2,027,902

PRODUCTION OF N-SUBSTITUTED AMINOPHENOLS

Miles Augustinus Dahlen, Wilmington, Del., assignor to E. I. du Pont de Nemours & Company, Wilmington, Del., a corporation of Delaware No Drawing. Application April 20, 1933, Serial No. 667,111

18 Claims. (Cl. 260—130)

This invention relates to phenols containing as a substituent a radical

in which the nitrogen atom is linked to the phenolic nucleus, more particularly N-aralkylidene aminophenols, and a process for the production thereof.

It is an object of this invention to provide a new and improved process for the production of compounds having a radical

in which the nitrogen atom is attached to a phenolic nucleus. A further object is to provide a new and improved commercially practicable process for the production of N-aralkylidene aminophenols. Another object is the provision of a commercially practicable process for the production of N-benzal-aminophenols in which the over-all yields from raw material to finished product are higher than in processes which have previously been used in commercial practise. A still further object is to provide a process for the production of N-benzal-para-aminophenol which is free from the hazards and dangers of certain processes heretofore in use. Other objects will appear hereinafter.

These objects are accomplished according to this invention whereby compounds containing a radical

in which the nitrogen atom is attached to a phenolic nucleus, are produced by reducing a nitrophenol to a primary aminophenol in the presence of an inert solvent for the formed aminophenol, and reacting the resultant solution with an aldehyde.

While the invention is susceptible to considerable variation and modification in the manner of its practical application, particularly as regards the kind and amount of raw materials and conditions of reaction, such as temperature and pressure, the following examples, in which the parts are by weight, will serve to illustrate how the invention may be practised.

Example I

Eight hundred fifty parts of the sodium salt of para-nitrophenol were dissolved in 4150 parts of water at 65° C. to 70° C., and sufficient sulfuric acid of 65% strength was added to make the solution slightly acid to Congo red papers.

An iron vessel, fitted with an agitator and jacket for heating, was charged with enough water to cover the agitator. Nine hundred parts of iron filings were added, followed by sufficient sulfuric acid of 65% strength to make the solution acid to litmus papers. The mass was heated to 95° C. with agitation, and the solution of para-nitrophenol prepared as above was introduced slowly, holding the temperature at 95° C. to 100° C. Care was taken that ferrous iron was present in the solution at all times.

When all the nitro compound had been added and the reduction was complete, magnesium oxide was added until tests for soluble iron indicated that it had been precipitated completely as iron hydroxide. Water was added to make the total volume equivalent to 10,000 parts of water, and the mass was heated to the boiling point (103° C. to 105° C.). It was then filtered through a preheated filter, and the iron sludge was washed with hot water until tests for para-aminophenol were negative.

The filtrate was collected in an open tank fitted with an agitator and a coil or jacket to provide for cooling. The filtrate was cooled to 75° C. to 95° C. and immediately treated with about 590 parts of benzaldehyde, resulting in condensation of the latter with the para-aminophenol to benzal-paraaminophenol. The mass was stirred for several hours to insure complete interaction, cooled to about 25° C., and the precipitated benzal-paraaminophenol was filtered. It was washed with sufficient cold water to displace the mother liquor and was then dried.

Approximately 1020 parts of N-benzal-paraaminophenol of the following structure:

were obtained, representing a yield of about 98% of the theory based on the para-nitrophenol used. The product was of a light tan to gray color, and by analysis and melting point determinations was shown to be practically pure.

It is to be noted that when a reduction of para-nitrophenol, as above described, is followed by isolation of the para-aminophenol, the yield of the latter material is not more than 85% of the theory, due to the filtrate losses necessitated by the solubility of the product in water. As a result, if the aminophenol is first isolated, and then condensed with benzaldehyde by the previously described processes, the over-all yield from para-nitrophenol cannot exceed 85% of the theory. Obviously, the new procedure is very very much superior in that the operation is simpler and cheaper to carry out and the yield is increased from less than 85% of the theory to 98% of the theory.

*Example II*

The process of Example I was repeated, substituting about 660 parts of para-tolualdehyde for the benzaldehyde. Following the same procedure of condensation and isolation, a yield of about 95% of the theory of N-para'-tolual-para-aminophenol of the following structure was obtained:

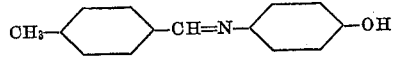

*Example III*

The process of Example I was repeated, substituting about 782 parts of ortho-chloro-benzaldehyde for the benzaldehyde. Following the same procedure of condensation and isolation, a yield of more than 95% of the theory of N-o'-chloro-benzal-para-aminophenol of the following structure was obtained:

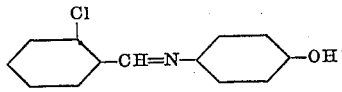

*Example IV*

The process of Example I was repeated exactly, substituting 850 parts of the sodium salt of ortho-nitrophenol for the same quantity of the sodium salt of para-nitrophenol. A yield of more than 90% of the theoretical quantity of N-benzal-ortho-aminophenol of the following structure was obtained:

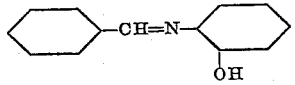

*Example V*

One hundred parts of 3-nitro-4-hydroxy-toluene were suspended in 250 parts of water, and two parts of an activated nickel catalyst were added. This suspension was placed in an autoclave and heated to 100° C. to 130° C. under a pressure of 300 to 500 pounds of hydrogen until hydrogen absorption was complete. The mass was cooled to about 95° C. and filtered to remove the insoluble catalyst. The filtrate was immediately treated with about 72 parts of benzaldehyde, and the mass stirred until condensation was complete. The product was then cooled to about 25° C. and the N-benzal-meta-amino-para-cresol of the following formula:

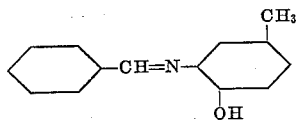

was filtered off, washed with a little water, and dried. A yield of about 90% of the theory based on 3-nitro-4-hydroxy-toluene was obtained.

*Example VI*

The 100 parts of 3-nitro-4-hydroxy-toluene in Example V were replaced by 110 parts of 4-nitro-2-methoxy-phenol. The reduction, condensation with benzaldehyde, and isolation of the final product were carried out as before. An excellent yield of N-benzal-amino-guiacol of the following formula was obtained:

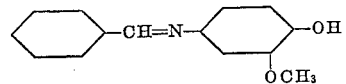

*Example VII*

The process of Example V was repeated, substituting 113 parts of 4-chloro-2-nitrophenol for the 3-nitro-4-hydroxy-toluene, and about 92 parts of anisaldehyde (para-methoxy-benzaldehyde) for the benzaldehyde. Following the same reduction, condensation and isolation procedure, an excellent yield of N-para'-anisal-para-chloro-ortho-aminophenol of the following structure was obtained:

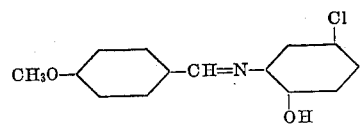

Instead of anisaldehyde, the corresponding proportions of para-nitro-benzaldehyde may be employed.

According to procedures similar to those described in the examples, a wide variety of other products may be prepared, all of which are characterized by having a radical

in which the nitrogen atom is attached to a carbon atom of a phenolic nucleus. For example, the invention contemplates the reaction of mono-aldehydes with phenols containing one or more primary amino groups. The following formula is illustrative of the type of products obtained:

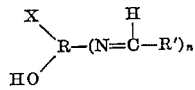

in which R represents an aromatic nucleus, preferably of the benzene series, $n$ represents an integer, preferably 1, X represents hydrogen or a substituent group which is preferably non-reducible under the conditions of reducing the nitrophenol, examples of such non-reducible substituents being alkyl (e. g., methyl, ethyl, isopropyl, etc.), alkoxy (e. g., methoxy, ethoxy, etc.), aryloxy (e. g., phenoxy, naphthoxy, etc.), aryl (e. g., phenyl, naphthyl, etc.), hydroxy and halogens (e. g., chlorine, bromine, etc.), and R' represents hydrogen, alkyl, aralkyl (benzyl, and the like), aryl, hydroaromatic (cyclopentane, cyclohexane, hydronaphthalene, etc.), and heterocyclic (furfurane, morpholine, hydrothiazine, nicotine, quinoline, and the like) radicals. When R' is a carbon radical, it may contain substituents other than hydrogen. Thus, where R' is an aryl nucleus, it may contain substituents such as, for example, alkyl, alkoxy, halogen, and nitro groups. The nitrophenols from which these products are prepared have the general formula:

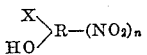

and the aldehydes have the general formula R'—CHO, in which R, X, R' and $n$ have the foregoing signification.

Specific examples of such products and the raw materials from which they may be prepared, including the products given in the examples, are:

| Product | Prepared from |
|---|---|
| N-benzal-para-aminophenol | Para-nitrophenol benzaldehyde. |
| N-benzal-ortho-aminophenol | Ortho - nitrophenol benzaldehyde. |
| N - para' - tolual - para - aminophenol. | Para - nitrophenol para - tolualdehyde. |
| Ortho'-chloro-N-benzal-para-amino-phenol | Para - nitrophenol ortho - chlorobenzaldehyde. |
| N - benzal - meta - amino - para - cresol. | 3 - nitro - 4 - hydroxy - toluene benzaldehyde. |
| N-benzal-para-amino-guiacol | 4 - nitro - 2 - methoxy - phenol benzaldhyde. |
| N - para' - anisal - para - chloro - ortho-aminophenol. | 4 - chloro - 2 - nitrophenol para-methoxy-benzaldehyde. |
| N - (4' - methoxy - benzal) - 3 - amino-6-hydroxy-toluene. | 3 - nitro - 6 - hydroxy - toluene para-anisaldehyde. |
| N - (2' - chloro - benzal) - ortho - aminophenol. | Ortho-nitrophenol ortho-chlorobenzaldehyde. |
| N - (3'-hydroxy - benzal) - meta - aminophenol. | Meta-nitrophenol meta-hydroxybenzaldehyde. |
| N - (4'-phenoxy - benzal) - para - amino-guiacol. | 4 - nitro - 2 - methoxy - guiacol 4'-phenoxy-benzaldehyde. |
| N - (alpha - naphthal) - para - aminophenol. | Para - nitrophenol alpha - naphthaldehyde. |
| N-(4'-xenal)-ortho-aminophenol. | Ortho-nitrophenol para-phenylbenzaldehyde. |
| 1-benzalamino-7-naphthol. | 1-nitro-7-naphthol benzaldehyde. |
| 4 - benzalamino - 1 - hydroxy anthracene. | 4-nitro-1-hydroxy anthracene benzaldehyde. |
| 2, 4-dibenzalamino-phenol. | 2, 4-dinitrophenol benzaldehyde (2 mols). |
| 2, 4, 6-tri-(para-tolual)-aminophenol. | 2, 4, 6-trinitrophenol para-tolualdehyde (3 mols). |
| N - heptylidene - para - aminophenol. | Para-nitrophenol heptaldehyde. |
| N - heptylidene - ortho - aminophenol. | Ortho-nitrophenol heptaldehyde. |
| N-furfural-para-aminophenol | Para-nitrophenol furfural. |
| N-ethylidene-para-aminophenol. | Para-nitrophenol acetaldehyde. |
| N - hexahydrobenzal - para - aminophenol. | Para-nitrophenol hexahydrobenzaldehyde. |

Similarly, the reduction products of the nitrophenols may be reacted with other acyclic, isocyclic and heterocyclic aldehydes including those of the pyridine, quinoline, diphenyl, benzene, naphthalene, anthracene, phenanthrene and similar systems. Compounds containing more than one aldehyde group may be used. An example of such a product is N-terephthalal-para-aminophenol prepared from para-nitrophenol (2 mols) and terephthaldehyde, falling in the general classification of compounds having the following formula:

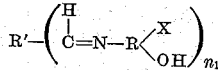

in which R, R' and X have the foregoing signification, and $n_1$ is an integer more than 1. The nitrophenols from which these products are prepared have the general formula

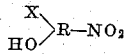

and the aldehydes the general formula

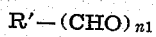

where R, X, R' and $n_1$ have the foregoing signification.

The following general methods of procedure are the ones preferably employed:

(1) The nitrophenol is reduced with iron in the presence of a small quantity of ferrous ion and in the presence of a solvent for the formed aminophenol. When the reduction is complete, the soluble iron is precipitated by a mild alkali. The reaction mass is then made up to a volume such that the aminophenol is entirely soluble at temperatures of 95° C. or higher. The mass is then filtered at 95° C. or higher, and the filtrate is reacted with the aldehyde.

(2) The nitrophenol is reduced by liquid phase catalytic hydrogenation over a suitable catalyst, the liquid medium being a solvent for the formed aminophenol. When reduction is complete, the catalyst is removed by filtration and the filtrate is reacted with the aldehyde.

The solvent preferably used in the iron reduction procedure is water or ethyl alcohol. In the catalytic hydrogenation procedure the solvents preferably used are water, ethyl alcohol or mixtures thereof. Other solvents may be used provided they are substantially inert. Non-polar organic liquids such as benzene, toluene, cyclohexane, tetrahydronaphthalene, decahydronaphthalene, heptane, methyl alcohol, butanol, ethyl ether, amyl ether, and chlorobenzene may be mentioned as further specific examples of solvents which may be used in the catalytic hydrogenation.

When the iron reduction procedure is followed, other acids such as, for example, formic, acetic and hydrochloric, may be substituted for sulfuric acid. The nitrophenols may be introduced as solids or liquids in the reducing medium instead of in the form of an aqueous solution as described in the examples. The temperature at which the reductions are carried out may be varied suitably and in accordance with the ease of reduction of the various aminophenols. Other mild alkalis, such as, for example, sodium carbonate, sodium bicarbonate, potassium carbonate, potassium bicarbonate, and the like may be used in precipitating the soluble iron from solution. The volume and temperature employed at the filtration stage may vary according to the solubility of the amino-phenol produced.

The temperature at which the condensation of the aminophenol with the aldehyde is carried out may be varied within relatively wide limits, depending largely upon the specific raw materials. Similarly, the temperature at which the product is filtered and washed may be varied.

When the hydrogenation methods are used for the reduction of the nitrophenols, some of the possible variations are as follows: The nitrophenol may be produced as the free phenol or in the form of a metal salt. Instead of the nickel catalyst described in the examples, other catalysts which function in such reductions, especially catalysts of the iron group such as active iron or cobalt, may be employed. Likewise, copper or silver catalysts may be employed. The catalyst may also consist of a salt of a hydrogenating metal with a promoting oxide. Such a catalyst is copper chromite which may be used in place of nickel, either with or without previous reduction. The catalyst is preferably carried on an inert support such as, for example, kieselguhr, carborundum or alumina. Activated nickel wool may be used.

The temperature and hydrogen pressure under which the catalytic reduction is effected may be varied within wide limits. Convenient pressures in most instances are about 10 to about 100 atmospheres. Convenient temperatures are usually about 75° C. to about 200° C., in any case preferably being below temperatures giving rise to substantial decomposition of the products. The condensation with the aldehyde may be carried out with various conditions of temperature and concentration. Likewise, the filtration, washing and drying of the final product may be effected at various temperatures.

The invention has given especially desirable results in the production of N-aralkylidene-aminophenols. These products may be used in the production of dyes and in the production of antioxidants for gasoline, rubber and fats. They are particularly suitable for use as raw materials in the manufacture of N-aralkyl-aminophenols. Thus, N-benzal-para-aminophenol may be used as a raw material for the production of N-benzyl-para-aminophenol.

The yields of various N-aralkylidene-aminophenols obtainable by this process are higher than in previous processes which have used the isolated aminophenol as a starting material. Thus, as stated in Example I, the yield of N-benzal-para-aminophenol from para-nitrophenol in accordance with the present invention may be 98% of theory as compared to approximately 85% where the para-aminophenol is isolated. Furthermore, para-aminophenol is a difficult substance to handle on account of the fact that it causes dermatitis. Also, the aminophenols are very sensitive to oxidation and other side reactions and are, therefore, difficult to obtain as such in a high state of purity.

Oxidation and other contamination caused by lengthy isolation-purification steps are avoided by the present invention since, by reducing the nitrophenols according to the procedures described in the presence of a solvent, the solvent solution obtained is substantially free from impurities which affect adversely the condensation reaction with the aldehyde; and it is, therefore, possible to react the solution with the aldehyde immediately. That the nitrophenol reduction product could be reacted with the aldehyde to produce the desired products in high yields is surprising in view of the normal sensitivity of the aldehyde-amine condensation reaction to impurities.

As many apparently widely different embodiments of this invention may be made without departing from the spirit and scope thereof, it is to be understood that I do not limit myself to the specific embodiments thereof except as defined in the following claims.

I claim:

1. The process which comprises reacting a nitrophenol with a reducing agent under conditions forming the corresponding primary aminophenol, in the presence of an inert solvent for the aminophenol, and reacting the resultant solution with an aldehyde.

2. The process which comprises reacting a nitrophenol with a reducing agent under conditions forming the corresponding primary aminophenol, in the presence of an inert solvent for the aminophenol, and reacting the resultant solution with an aldehyde of the benzene series.

3. In a process of producing compounds of the following formula

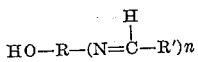

wherein $n$ represents an integer, R represents a phenyl nucleus which may contain hydrocarbon substituents, and R′ represents a radical of the benzene series, the steps which comprise reacting a compound of the formula

$n$ and R having the foregoing significance, with an iron reducing agent to form the corresponding aminophenol, in the presence of an inert solvent for the aminophenol, removing the iron and reacting the resultant solution with a compound of the formula

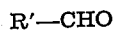

R′ having the foregoing significance.

4. The process of claim 3 in which the solvent medium is water.

5. In a process of producing compounds of the following formula

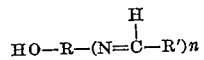

wherein $n$ represents an integer, R represents a phenyl nucleus which may contain hydrocarbon substituents, and R′ represents a radical of the benzene series, the steps which comprise subjecting a compound of the formula

$n$ and R having the foregoing significance, to liquid phase catalytic hydrogenation in the presence of an inert solvent for the formed aminophenol, and reacting the resultant solution with a compound of the formula

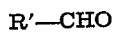

R′ having the foregoing significance.

6. The process of claim 5 in which the solvent medium is water.

7. The process which comprises subjecting para-nitrophenol to reduction to the aminophenol in the presence of an inert solvent for the formed aminophenol, and reacting the resultant solution with benzaldehyde.

8. The process of claim 7, in which the solvent is water.

9. The process which comprises reducing para-nitrophenol in acidic aqueous solution with iron in the presence of ferrous ion, neutralizing the solution, separating the iron, and reacting the residual solution of aminophenol with benzaldehyde.

10. The process which comprises subjecting paranitrophenol to catalytic hydrogenation in the presence of an inert solvent for the formed aminophenol, and reacting the resultant solution with benzaldehyde.

11. The process of producing N-benzal-para-aminophenol which comprises reducing para-nitrophenol in acidic aqueous solution with iron in the presence of a small quantity of ferrous ion, adding a mild alkali sufficient in amount to neutralize the solution and precipitate the soluble iron as an insoluble iron compound, diluting the reaction mass with water to a volume such that the aminophenol is soluble at temperatures above about 95° C., separating the solid material at a temperature above about 95° C., and reacting the residual solution with benzaldehyde at a temperature within the range of about 75° C. to about 95° C.

12. The process of producing N-benzal-para-aminophenol which comprises dissolving the sodium salt of para-nitrophenol in water at about 65° C. to about 70° C., adding sufficient relatively dilute sulfuric acid to make the solution slightly acid, adding the resultant solution to metallic iron in a state of sub-division in relatively dilute sulfuric acid, while maintaining ferrous iron in the solution, and maintaining a temperature of about 95° C. to about 100° C. until reduction is substantially complete, adding a mild alkali to the solution to precipitate iron in the form of its hydroxide, diluting the reaction mass with water to such volume that the aminophenol is entirely soluble at temperatures above about 95° C., separating the solid material at a temperature above about 95° C., and reacting the residual solution with benzaldehyde at a temperature within the range of about 75° C. to about 95° C.

13. The process of claim 12, in which the mild alkali employed to remove soluble iron from solution is magnesium oxide.

14. The process of producing N-benzal-para-aminophenol which comprises dissolving about 850 parts of the sodium salt of para-nitrophenol in about 4150 parts of water at 65° C. to 70° C., adding sufficient sulfuric acid of about 65% strength to make the solution slightly acid, adding the resultant solution to about 900 parts of iron filings in a 65% sulfuric acid solution while maintaining ferrous iron in the solution and maintaining a temperature of about 95° C. to 100° C. until reduction is substantially complete, then adding magnesium oxide to the solution in sufficient amount to precipitate the iron, adding water sufficient to make the total volume 10,000 parts, boiling the resultant mixture, filtering and washing the solid residue, cooling the filtrate to about 75° C. to 95° C., immediately reacting it with about 590 parts of benzaldehyde, thereafter cooling to about 25° C., and separating the precipitated N-benzal-para-aminophenol.

15. In a process of producing compounds of the following formula $$HO-R-N=\overset{H}{\underset{|}{C}}-R'$$

wherein R represents a phenyl nucleus which may contain hydrocarbon substituents, and R' represents a radical of the benzene series, the steps which comprise reacting a compound of the formula $$HO-R-NO_2$$

in which R has the foregoing significance, with an iron reducing agent to form the corresponding aminophenol, in the presence of an inert solvent for the aminophenol, removing the iron, and reacting the resultant solution with a compound of the formula $$R'-CHO$$

R' having the foregoing significance.

16. In a process of producing compounds of the following formula $$HO-R-N=\overset{H}{\underset{|}{C}}-R'$$

wherein R represents a phenyl nucleus which may contain hydrocarbon substituents, and R' represents a radical of the benzene series, the steps which comprise subjecting a compound of the formula $$HO-R-NO_2$$

in which R has the foregoing significance, to liquid phase catalytic hydrogenation in the presence of an inert solvent for the formed aminophenol, and reacting the resultant solution with a compound of the formula $$R'-CHO$$

R' having the foregoing significance.

17. In a process of producing compounds of the following formula $$HO-R-(N=\overset{H}{\underset{|}{C}}-R')_n$$

wherein $n$ represents an integer, and R represents a phenyl nucleus containing a hydrocarbon ether substituent, and R' represents a radical of the benzene series, the steps which comprise subjecting a compound of the formula $$HO-R-(NO_2)_n$$

$n$ and R having the foregoing significance, to liquid phase catalytic hydrogenation in the presence of an inert solvent for the formed aminophenol, and reacting the resultant solution with a compound of the formula $$R'-CHO$$

R' having the foregoing significance.

18. In a process of producing compounds of the following formula $$HO-R-(N=\overset{H}{\underset{|}{C}}-R')_n$$

wherein $n$ represents an integer, R represents a halogen substituted phenyl nucleus, and R' represents a radical of the benzene series, the steps which comprise subjecting a compound of the formula $$HO-R-(NO_2)_n$$

$n$ and R having the foregoing significance, to liquid phase catalytic hydrogenation in the presence of an inert solvent for the formed aminophenol, and reacting the resultant solution with a compound of the formula $$R'-CHO$$

R' having the foregoing significance.

MILES AUGUSTINUS DAHLEN.